US012050351B2

(12) United States Patent
Jiang et al.

(10) Patent No.: US 12,050,351 B2
(45) Date of Patent: Jul. 30, 2024

(54) COMPACT OPTICAL MODULE INCLUDING MULTIPLE ACTIVE COMPONENTS AND PATH CHANGER COMPONENT

(71) Applicant: Global Technology Inc., Ningbo (CN)

(72) Inventors: Dong-Biao Jiang, Ningbo (CN); Jian-Hong Luo, Ningbo (CN); Fu Chen, Ningbo (CN); Xiang Zheng, Ningbo (CN)

(73) Assignee: Global Technology Inc., Ningbo (CN)

( * ) Notice: Subject to any disclaimer, the term of this patent is extended or adjusted under 35 U.S.C. 154(b) by 0 days.

(21) Appl. No.: 17/856,181

(22) Filed: Jul. 1, 2022

(65) Prior Publication Data

US 2023/0258887 A1    Aug. 17, 2023

(30) Foreign Application Priority Data

Feb. 14, 2022   (CN) .......................... 202210132834.2

(51) Int. Cl.
*H04B 10/00* (2013.01)
*G02B 6/42* (2006.01)
*H04B 10/40* (2013.01)

(52) U.S. Cl.
CPC ......... *G02B 6/4246* (2013.01); *G02B 6/4263* (2013.01); *H04B 10/40* (2013.01)

(58) Field of Classification Search
CPC ..... G02B 6/4246; G02B 6/4263; H04B 10/40
See application file for complete search history.

(56) References Cited

U.S. PATENT DOCUMENTS

| 5,003,625 A * | 3/1991 | Khoe ...................... G02F 2/002 398/205 |
| 9,372,315 B2* | 6/2016 | Miao ...................... G02B 6/421 |
| 9,551,833 B1* | 1/2017 | Li ............................ H04J 14/02 |
| 2002/0071188 A1* | 6/2002 | Aoki .................... G02B 6/2706 359/811 |
| 2002/0163691 A1* | 11/2002 | Wong .................... G02B 6/272 385/24 |
| 2003/0063844 A1* | 4/2003 | Caracci .................. G02B 6/32 385/24 |
| 2005/0125177 A1* | 6/2005 | Giaretta ................ H01S 5/0014 702/79 |
| 2005/0201750 A1* | 9/2005 | Togawa ............... G02B 6/3562 398/12 |
| 2007/0242957 A1* | 10/2007 | Zhu .................... G02B 6/29362 398/182 |
| 2009/0129783 A1* | 5/2009 | Ori ....................... G02B 6/4246 398/136 |
| 2011/0044696 A1* | 2/2011 | Lim ...................... H04B 10/40 398/139 |
| 2012/0051382 A1* | 3/2012 | Miao .................... H01S 5/02212 372/50.1 |

(Continued)

*Primary Examiner* — Agustin Bello
(74) *Attorney, Agent, or Firm* — Grossman Tucker Perreault & Pfleger, PLLC

(57) ABSTRACT

An optical module includes a housing, a plurality of active optical components and a path changer component. The housing has an airtight chamber. The active optical components are provided in the airtight chamber. The path changer component is provided in the airtight chamber, and the path changer component is configured to change an optical path of at least one of the active optical components.

10 Claims, 7 Drawing Sheets

(56) References Cited

U.S. PATENT DOCUMENTS

| | | | | |
|---|---|---|---|---|
| 2013/0034357 A1* | 2/2013 | Lim | .................... | G02B 6/4257 |
| | | | | 398/79 |
| 2013/0155642 A1* | 6/2013 | McColloch | .......... | G02B 6/4214 |
| | | | | 361/820 |
| 2014/0215816 A1* | 8/2014 | Kurokawa | ........... | G02B 6/4225 |
| | | | | 29/832 |
| 2021/0104865 A1* | 4/2021 | Hu | ........................ | H01S 5/0064 |
| 2021/0349018 A1* | 11/2021 | Venkatarayalu | ....... | G01N 21/45 |
| 2022/0329323 A1* | 10/2022 | Luo | .................... | H01S 5/02212 |
| 2023/0221561 A1* | 7/2023 | Danziger | ........... | G02B 27/0172 |
| | | | | 359/630 |
| 2023/0258887 A1* | 8/2023 | Jiang | ................... | G02B 6/4263 |
| | | | | 385/89 |

\* cited by examiner

US 12,050,351 B2

COMPACT OPTICAL MODULE INCLUDING MULTIPLE ACTIVE COMPONENTS AND PATH CHANGER COMPONENT

CROSS-REFERENCE TO RELATED APPLICATIONS

This application claims priority under 35 U.S.C. § 119(a) on Patent Application No(s). 202210132834.2 filed in China on Feb. 14, 2022, the entire contents of which are hereby incorporated by reference.

BACKGROUND

1. Technical Field

The present disclosure relates to optical communication, more particularly, an optical module in optical communication.

2. Related Art

Optical modules are generally installed in communication facilities in modern high-speed communication networks. With the improvement of optical communication system and the increase in demand of broad bandwidth by various network services, insufficient internal space and high energy consumption of the conventional optical modules should be overcome. Any solution to provide optical modules with small size, large amount of internal space for accommodation, and low energy consumption while enhancing bandwidth and transmission speed has been one of the important topics in this technical field.

SUMMARY

According to one aspect of the present disclosure, an optical module includes a housing, a plurality of active optical components and a path changer component. The housing has an airtight chamber. The active optical components are provided in the airtight chamber. The path changer component is provided in the airtight chamber as well, and is configured to change an optical path of at least one of the active optical components.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
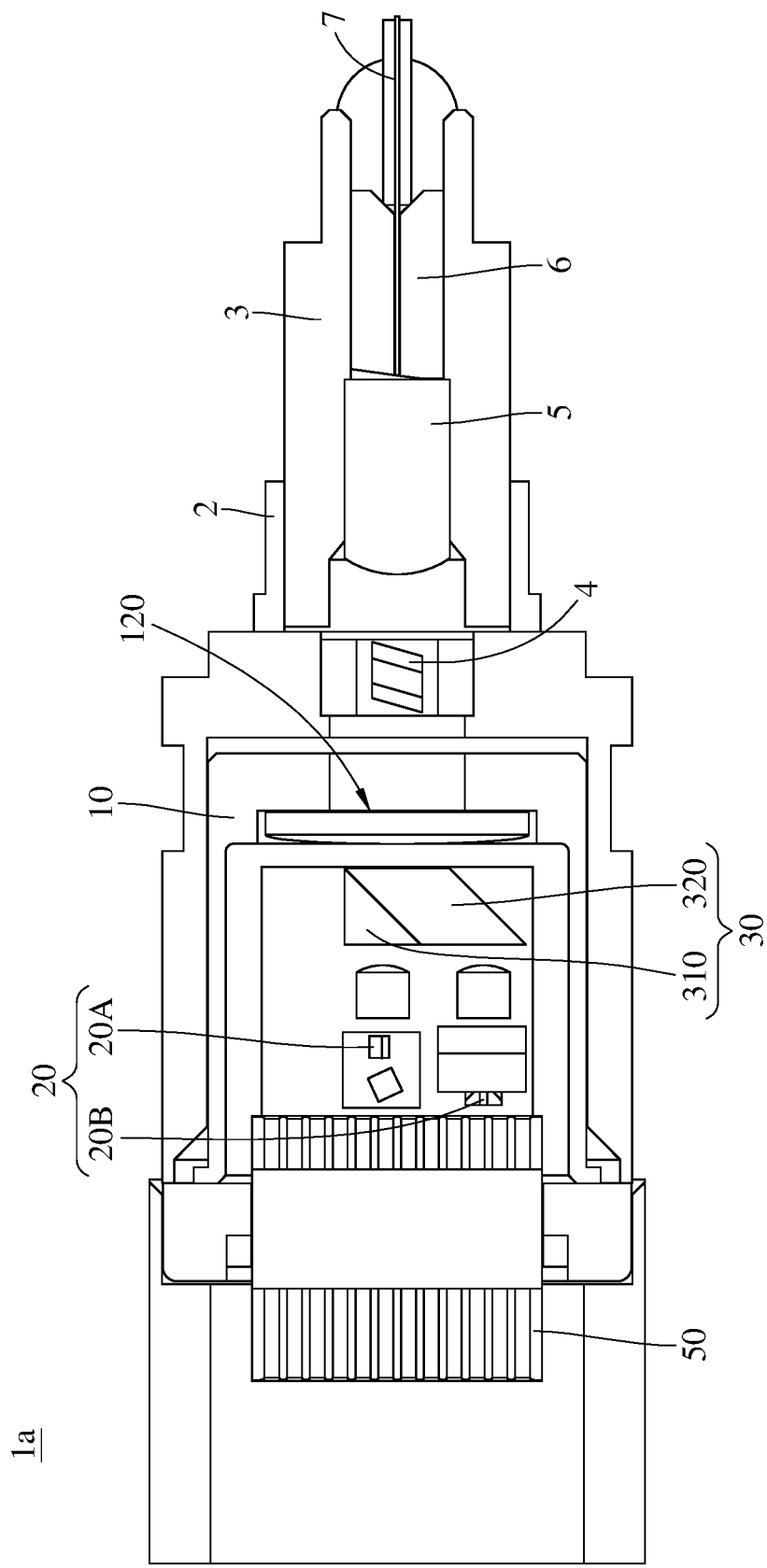
FIG. 1 is a schematic view of an optical module according to a first embodiment of the present disclosure.
Figure 3:
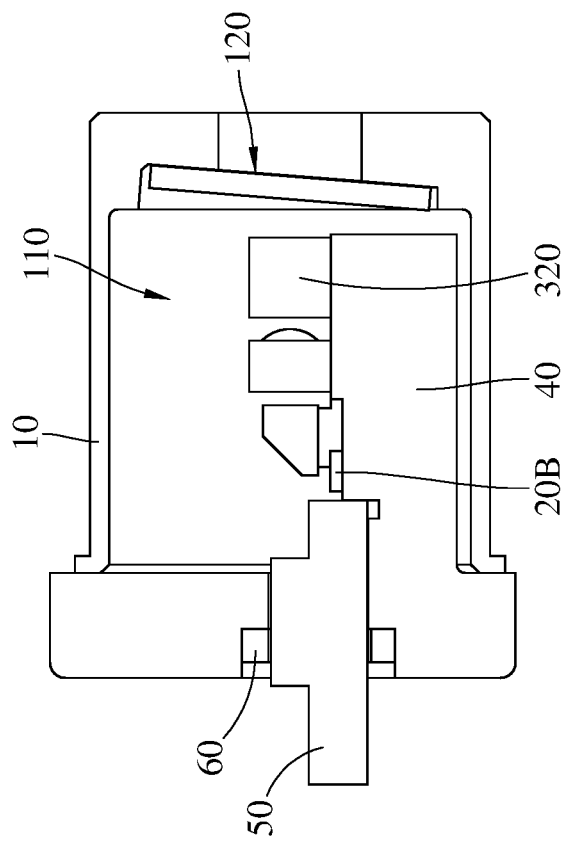
FIG. 3 is a schematic view of an optical transmitter of the optical module in FIG. 1.
Figure 2:
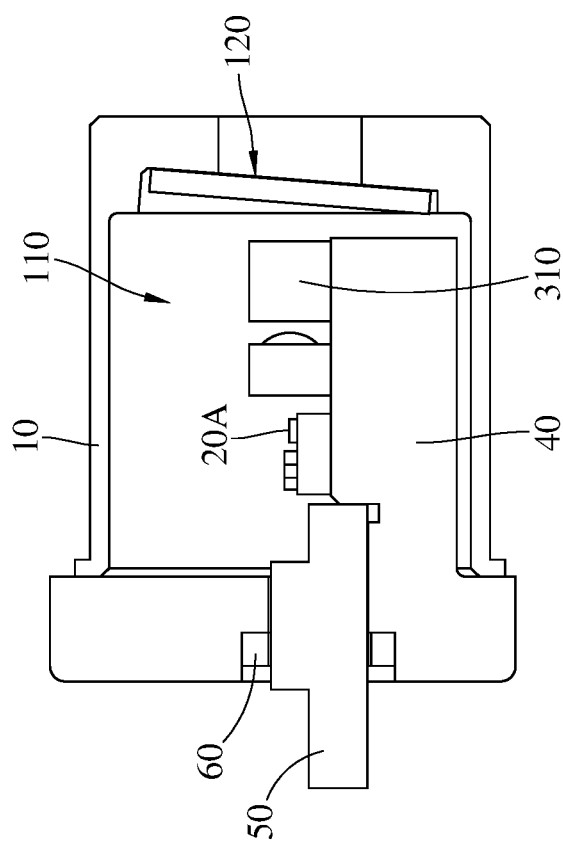
FIG. 2 is a schematic view of an optical receiver of the optical module in FIG. 1.
Figure 4:
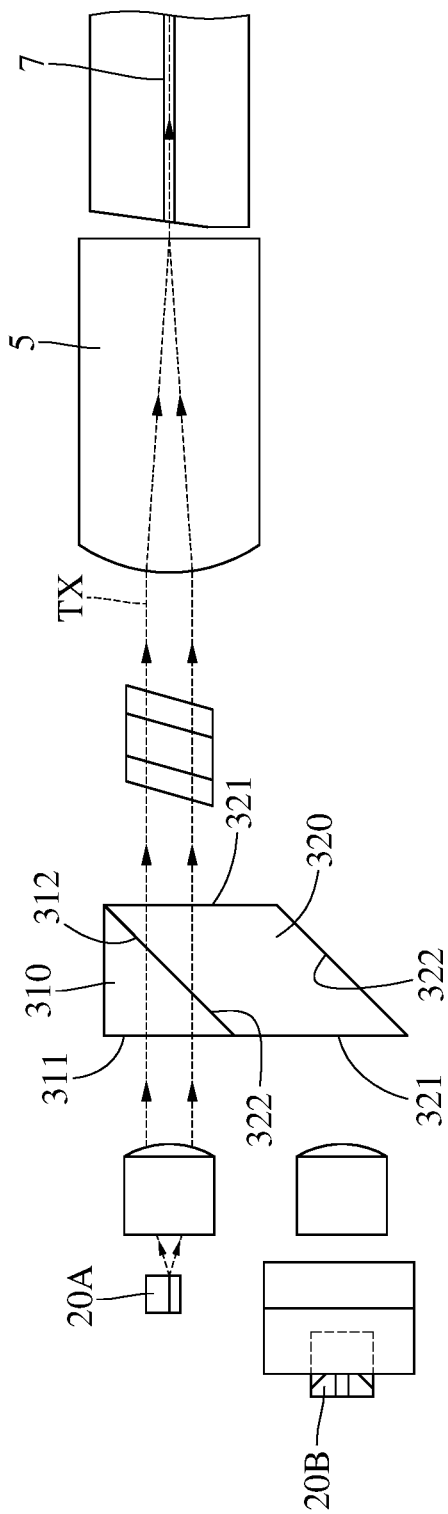
FIG. 4 and FIG. 5 are schematic views of optical paths in the optical module in FIG. 1.
Figure 5:
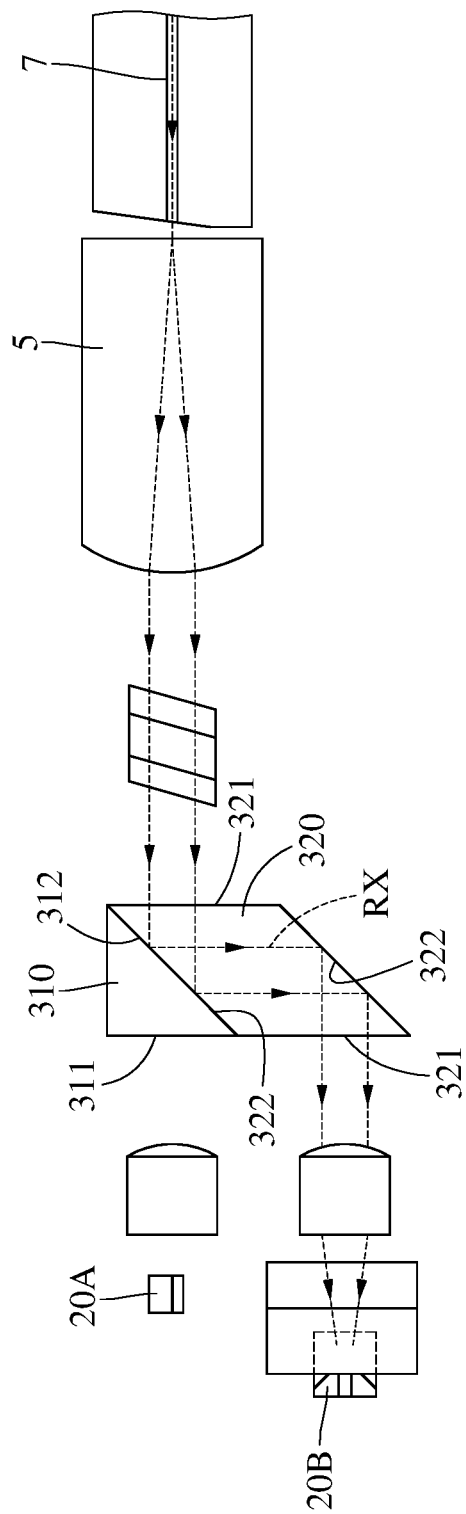

According to the present disclosure, an optical module including housing, active optical component and path changer component is provided. Please refer to FIG. 1 through FIG. 5. FIG. 1 is a schematic view of an optical module according to a first embodiment of the present disclosure, FIG. 2 is a schematic view of an optical receiver of the optical module in FIG. 1, FIG. 3 is a schematic view of an optical transmitter of the optical module in FIG. 1, FIG. 4 and FIG. 5 are schematic views of optical paths in the optical module in FIG. 1. In this embodiment, an optical module 1a may include a housing 10, a plurality of active optical components 20 and a path changer component 30.

The housing 10 may include a header (stem) and a cap for TO-can package. The housing 10 may have an airtight chamber 110 and a window 120 spatially connected with the airtight chamber 110. The active optical components 20 and the path changer component 30 are accommodated in the airtight chamber 110, and one of the active optical components 20 may be coaxially aligned with the window 120 of the housing 10.

Furthermore, the optical module 1a may include a carrier 40 and a ceramic feedthrough 50. The carrier 40 may be accommodated in the airtight chamber 110 of the housing 10, and the ceramic feedthrough 50 may be partially disposed within the housing 10, which represents that part of the ceramic feedthrough 50 is accommodated in the housing 10 and another part thereof exposes to outside. The carrier 40 may be a metallic heat sink carrying the active optical components 20 and the path changer component 30, and the carrier 40 may be configured to help heat dissipation of the active optical components 20. The ceramic feedthrough 50 may be fixed to the housing 10 by solder sealing 60, and the ceramic feedthrough 50 may be electrically connected with one or more active optical components 20 by wire bonding. The implementation of electrical signal transmission for the active optical components 20 by the ceramic feedthrough 50 can meet the requirements of high bandwidth and low RF loss.

In this embodiment, optical module 1a may further include a solder ring 2, a metallic sleeve 3, an optical isolator 4, a coupling lens 5 and a fiber ferrule 6. The solder ring 2 may be provided on the outer surface of the housing 10. The metallic sleeve 3 may be inserted into the solder ring 2 for preventing the electromagnetic interference. The optical isolator 4 may be accommodated in the housing 10, and the coupling lens 5 and the fiber ferrule 6 may be accommodated in the metallic sleeve 3. The optical isolator 4, the coupling lens 5 and the fiber ferrule 6 are configured to facilitate the optical coupling between the active optical components 20 and an optical fiber 7.

Details of the active optical components 20 and the path changer component 30 are described hereafter. As shown in FIG. 1 and FIG. 2, the active optical components 20 may include a combination of a single optical transmitter 20A with a single optical receiver 20B. Specifically, the optical transmitter 20A may be a laser diode of a transmitter subassembly (TOSA) in the optical module 1a, and the TOSA may include other elements, such as a collimating lens, a color filter and a monitor photodiode, in addition to the optical transmitter 20A. The optical receiver 20B may be a photodiode of a receiver subassembly (ROSA) in the optical module 1a, and the ROSA may include other elements, such as a collimating lens and a reflective mirror, in addition to the optical receiver 20B. Referring to FIG. 1, the optical transmitter 20A is coaxially aligned with the window 120 of the housing 10 and the optical fiber 7. The optical transmitter 20A can emit light ranging from 1270 nm to 1330 nm in wavelength as optical signals, and the optical receiver 20B can receive and respond optical signals ranging from 1270 nm to 1330 nm in wavelength.

In some other embodiments, the active optical component can generate or receive optical signals suitable for long distance transmission. The wavelength of the optical signals mentioned herein may refer to a peak in a spectral linewidth, and said optical signals in different wavelengths may refer to at least two different peaks.

The path changer component 30 may be accommodated in the airtight chamber 110 of the housing 10, and the path changer component 30 may be configured to change an optical path of at least one of the active optical components 20. In this embodiment, the path changer component 30 can change an optical path of light received by the optical receiver 20B.

As shown in FIG. 1 and FIG. 3, the path changer component 30 may include a right-angle prism 310 and an oblique prism 320. The right-angle prism 310 may have a light passing surface 311 (in FIGS. 4 and 5) substantially orthogonal to the optical path TX of the optical transmitter 20A, and an optical surface 312 (in FIGS. 4 and 5) inclined with respect to the optical path TX of the optical transmitter 20A. The light passing surface 311 and the optical surface 312 of the right-angle prism 310 might allow for the light within the wavelength of 1270 nm to pass through. In other words, the light passing surface 311 and the optical surface 312 might be associated with high transmittance for the optical signals provided by the optical transmitter 20A, such that the optical signals generated by the optical transmitter 20A can travel through the light passing surface 311 and the optical surface 312 to thereby reach the optical fiber 7 without turning or even tweaking the optical path TX along the original path.

The oblique prism 320 may have two light passing surfaces 321 which are substantially orthogonal to the optical path RX of the optical receiver 20B, and two optical surfaces 322 which are inclined with respect to the optical path RX of the optical receiver 20B. The optical surface 312 of the right-angle prism 310 may be attached to one of the optical surfaces 322 of the oblique prism 320. The light passing surfaces 321 of the oblique prism 320 might allow for the light within the wavelength of 1330 nm to pass through while the optical surface 322 might reflect the light toward the optical receiver 20B. As such, the light might be received by the optical receiver 20B. The light passing surface 321 might be associated with high transmittance for the optical signals to be traveling toward the optical receiver 20B. Consequently, external optical signals transmitted by the optical fiber 7 can enter into the optical module 1a and travel through the light passing surface 321, then can be reflected by the optical surfaces 322 twice before being received by the optical receiver 20B. In short, the optical path RX might be turned two times. The light passing surface 321 and the optical surface 322 of the oblique prism 320 might allow light emitted by the optical transmitter 20A within the wavelength of 1270 nm to pass through. The term "high transmittance" mentioned herein refers to the transmittance that meets the requirements for optical signal transmission. For example, a transmittance of at least 95% may be defined as high transmittance in order to achieve relevant technical effects for optical communication applications.

In this embodiment, allowing the light within specific wavelength (e.g., 1270 nm or 1330 nm) to pass through the light passing surface 311 might require the optical surface 312 and the light passing surface 321 to be equipped with a filter film on each of the light passing surface 311 and the optical surface 312, with the filter film capable of 95% or more in transmittance for specific wavelengths. Also, an exemplary means for reflecting the light within the specific wavelength (e.g., 1330 nm) at the optical surface 322 may be enabled by providing a filter film on the optical surface 322, where such filter film has a reflectivity of 99% or more for a specific wavelength.

Referring to FIG. 2 and FIG. 4, the optical transmitter 20A may be disposed to correspond the right-angle prism 310, and the optical receiver 20B may be disposed to correspond the oblique prism 320. The ceramic feedthrough 50 supplies power to the optical transmitter 20A to generate optical signals. The optical signals generated by the optical transmitter 20A travel through the right-angle prism 310 and the oblique prism 320 before converging at the coupling lens 5 and being coupled into the optical fiber 7.

Referring further to FIG. 3 and FIG. 5, the external optical signals pass through the coupling lens 5 and the optical isolator 4 through the optical fiber 7. The coupling lens 5 might result in parallel light rays entering into the optical module 1a. The external optical signals sequentially travel through the light passing surface 321, the optical surface 322, another optical surface 322 and another light passing surface 321 of the oblique prism 320, and the optical path RX is turned once at each of the two optical surfaces 322 (thus twice in total). The external optical signals are eventually received by the optical receiver 20B which is non-coaxially aligned with the optical fiber 7. The optical receiver 20B responds to the received optical signals to convert the optical signals into electrical signals, and then output the electrical signals to the ceramic feedthrough 50.

According to the embodiment depicted in FIG. 1 through FIG. 5, the path changer component 30 changes the direction of the optical path RX for the external optical signals, such that the external optical signals can be received by the optical receiver 20B that is non-coaxially aligned with the optical fiber 7. The optical design with the path changer component 30 allows for the optical module 1a to be fabricated by using conventional hermetic package design while accommodating bidirectional design that generally includes single receiver and single transmitter. For example, the optical module 1a can be fabricated by using a TO-can package in which the coaxial optical transmitter 20A and the non-coaxial optical receiver 20B are provided simultaneously.

Figure 6:
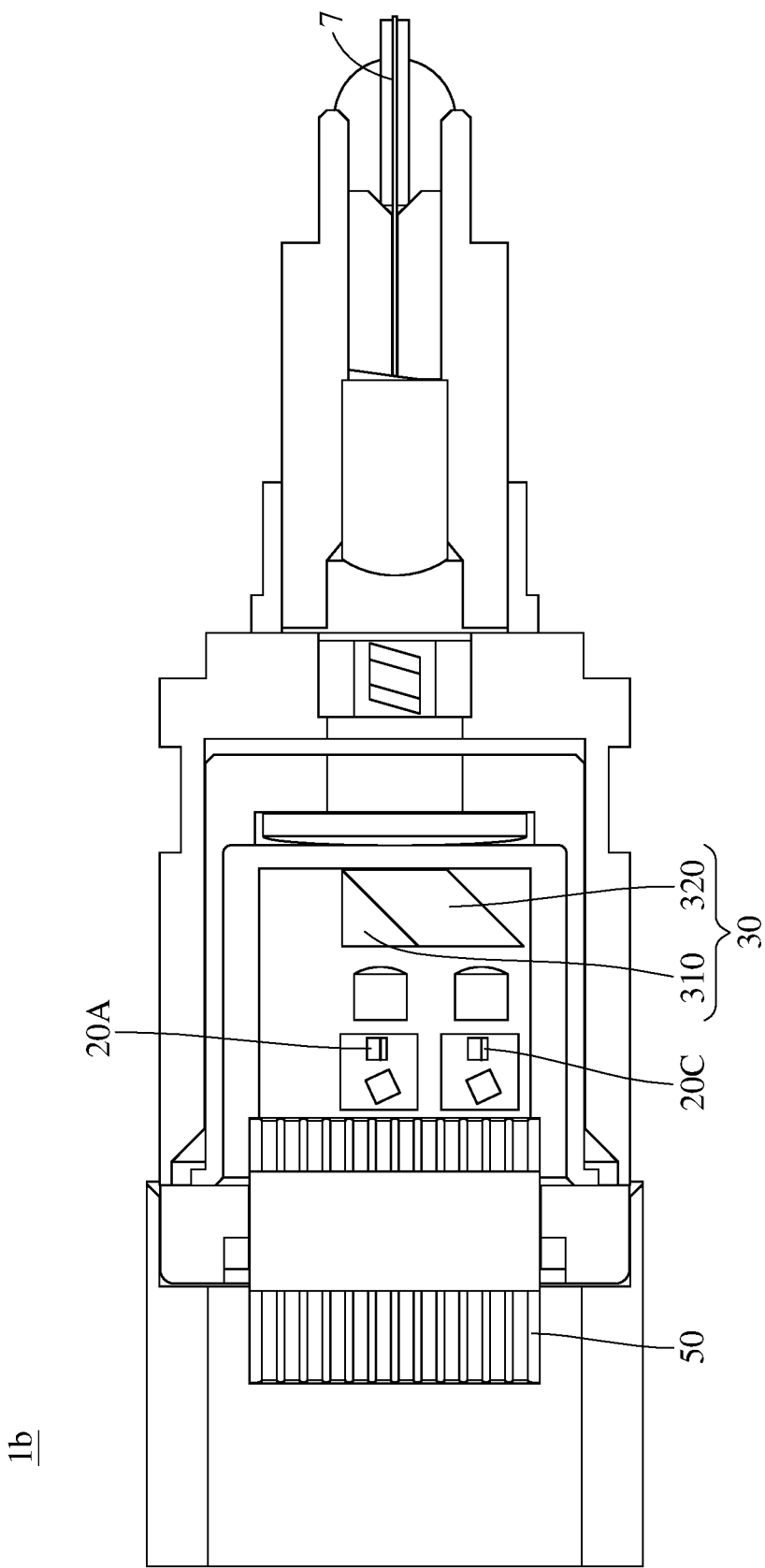
FIG. 6 is a schematic view of an optical module according to a second embodiment of the present disclosure.
Figure 7:
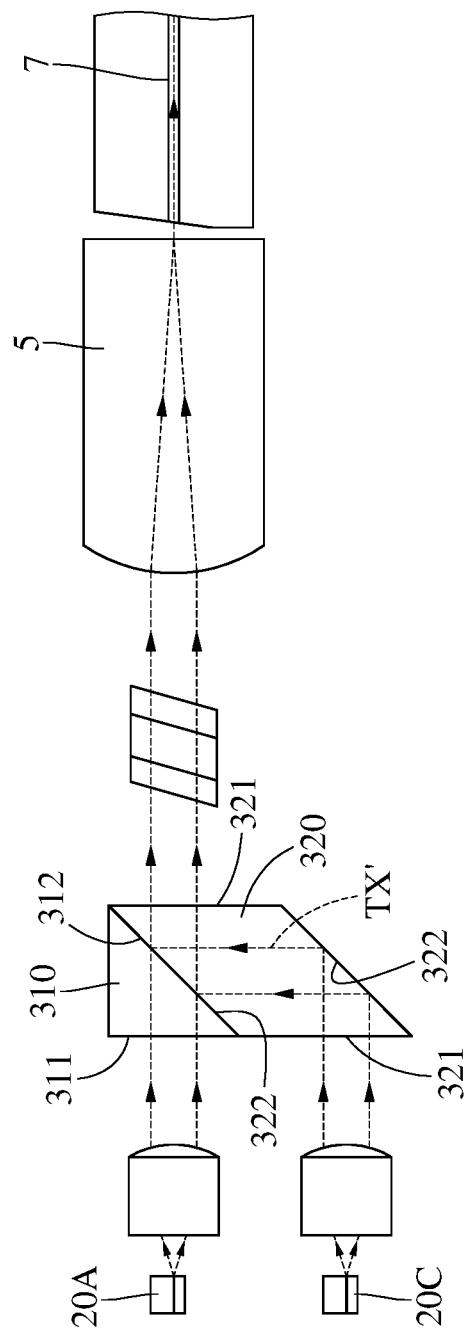
FIG. 7 is a schematic view of optical paths in the optical module in FIG. 6.

According to one embodiment of the present disclosure, the active optical components may include a combination of two optical transmitters. FIG. 6 is a schematic view of an optical module according to a second embodiment of the present disclosure, and FIG. 7 is a schematic view of optical paths in the optical module in FIG. 6. In this embodiment, an optical module 1b may include a plurality of active optical components, and the active optical components may include a combination of optical transmitters 20A and 20C. Each of the optical transmitters 20A and 20C may be a laser diode of a TOSA in the optical module 1b. Any specific configuration of each component in the optical module 1b and its relative spatial relationship to other components can be referred to the corresponding component in FIG. 1 through FIG. 5.

In this embodiment, the optical transmitter 20A coaxially aligned with the optical fiber 7 can generate optical signals within the wavelength of 1270 nm, and the optical transmitter 20C non-coaxially aligned with the optical fiber 7 can generate optical signals within the wavelength of 1330 nm. The path changer component 30 can change an optical path of the light emitted by the optical transmitter 20C. The light passing surface 311 and the optical surface 312 of the right-angle prism 310 might allow for the light emitted by the optical transmitter 20A within the wavelength of 1270 nm to pass through. The light passing surfaces 321 of the oblique prism 320 might allow for the light emitted by the optical transmitter 20C within the wavelength of 1330 nm to pass through, and the optical surfaces 322 might reflect the light emitted by the optical transmitter 20C (1330 nm). The light passing surface 321 and the optical surface 322 of the oblique prism 320 meanwhile might allow for the light emitted by the optical transmitter 20A (1270 nm) to pass through.

Referring to FIG. 7, the optical transmitter 20A may be disposed to correspond the right-angle prism 310, and the optical transmitter 20C may be disposed to correspond the oblique prism 320. The ceramic feedthrough 50 supplies power to the optical transmitters 20A and 20C to generate the optical signals. The optical signals generated by the optical transmitter 20A might travel through the right-angle prism 310 and the oblique prism 320 before converging at the coupling lens 5 and being coupled into the optical fiber 7. Furthermore, the optical signals generated by the optical transmitter 20C might sequentially travel through the light passing surface 321, the optical surface 322, another optical surface 322 and another light passing surface 321 of the oblique prism 320. The optical path TX' is turned once at each of the two optical surfaces 322. The optical signals generated by the optical transmitter 20C are eventually coupled into the optical fiber 7.

By using the path changer component 30 to change the direction of the optical path TX' for the optical signals generated by optical transmitter 20C, the optical signals generated by the optical transmitter 20C might still be coupled into the optical fiber 7. Therefore, the optical design with the path changer component 30 allows for the optical module 1b to be accommodated using both conventional hermetic package design and dual-emission bidirectional design. For example, the optical module 1b can be using a TO-can package in which the optical transmitter 20A and the non-coaxial optical transmitter 20C are provided.

Figure 8:
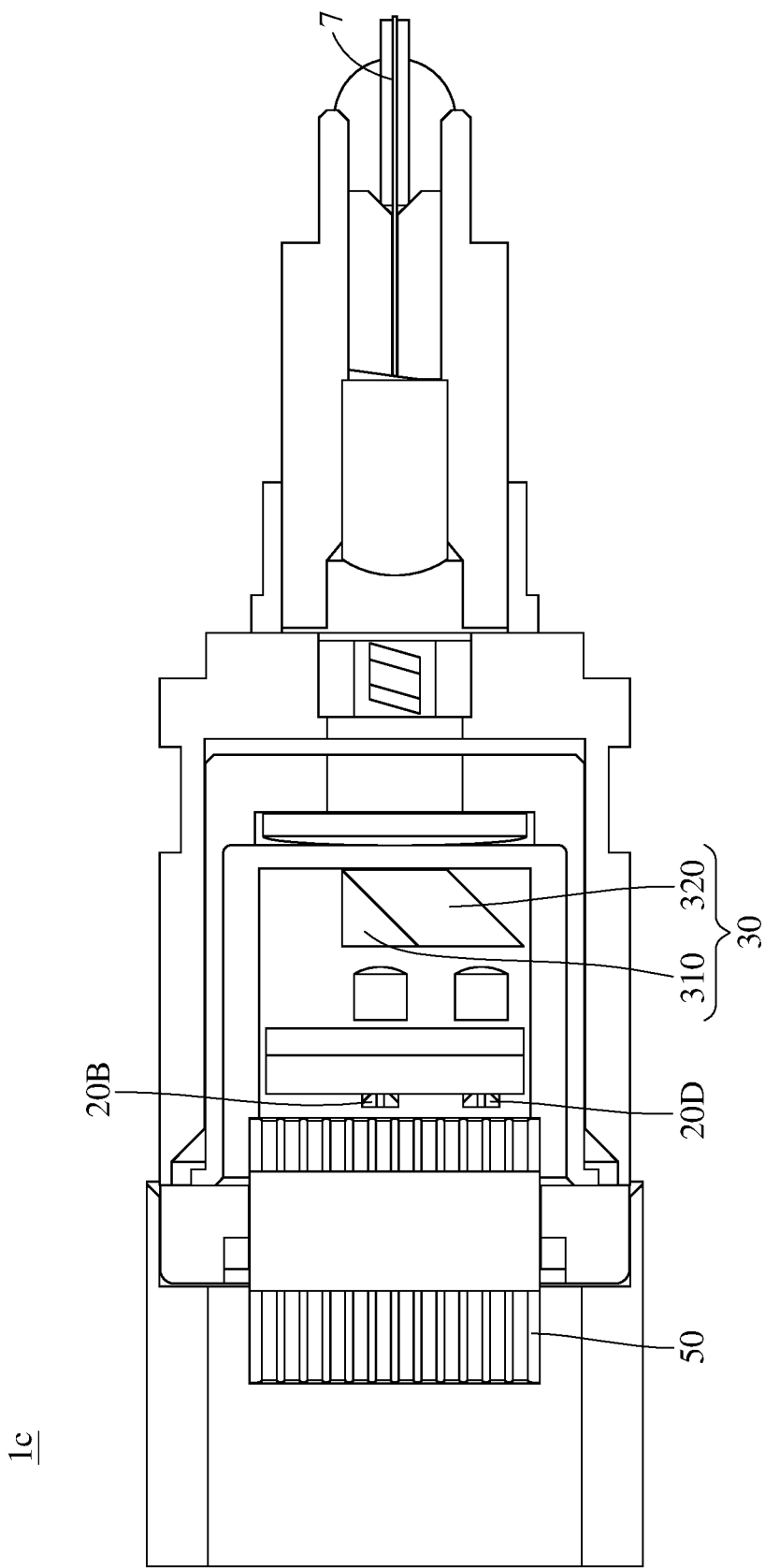
FIG. 8 is a schematic view of an optical module according to a third embodiment of the present disclosure.
Figure 9:
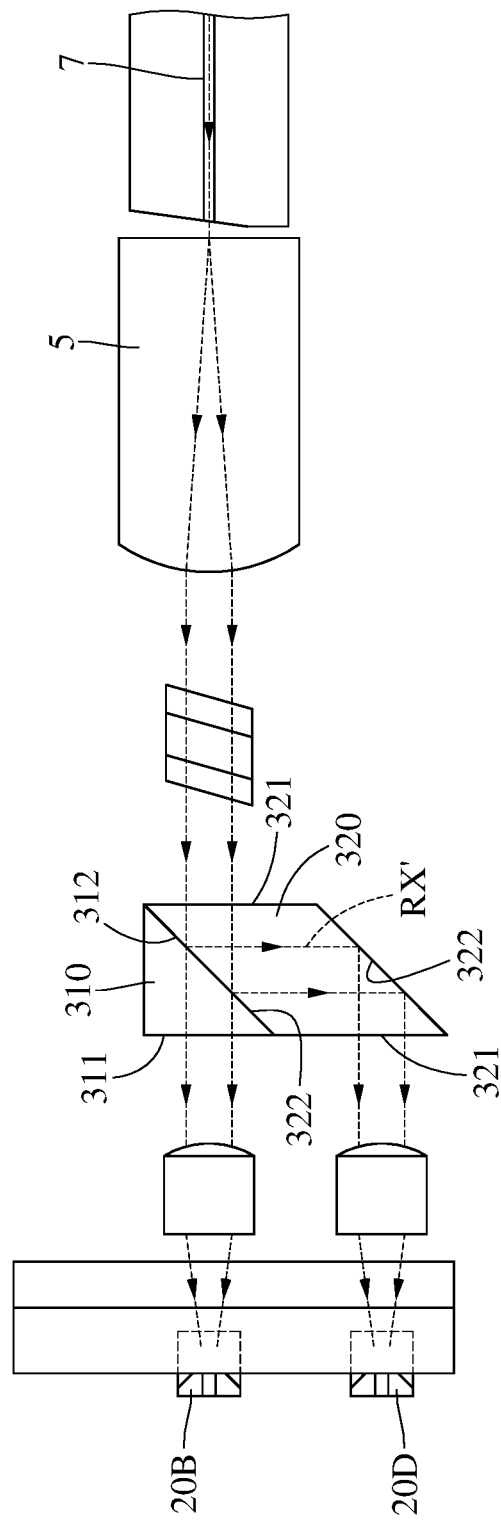
FIG. 9 is a schematic view of optical paths in the optical module in FIG. 8.

According to one embodiment of the present disclosure, the active optical components may include a combination of two optical receivers. FIG. 8 is a schematic view of an optical module according to a third embodiment of the present disclosure, and FIG. 9 is a schematic view of optical paths in the optical module in FIG. 8. In this embodiment, an optical module 1c may include a plurality of active optical components, and the active optical components may include a combination of optical receivers 20B and 20D. Each of the optical receivers 20B and 20D may be a photodiode of a ROSA in the optical module 1c. Any specific configuration of each component in the optical module 1c and its relative spatial relationship to other components can be referred to the corresponding component in FIG. 1 through FIG. 5.

In this embodiment, the optical receiver 20B coaxially aligned with the optical fiber 7 can receive and respond to optical signals within the wavelength of 1270 nm, and the optical receiver 20D non-coaxially aligned with the optical fiber 7 can receive and respond to optical signals within the wavelength of 1330 nm. The path changer component 30 can change an optical path of the light traveling toward by the optical receiver 20D. The light passing surface 311 and the optical surface 312 of the right-angle prism 310 might allow for the light traveling toward the optical receiver 20B within the wavelength of 1270 nm to pass through. The light passing surfaces 321 of the oblique prism 320 might allow for the light traveling toward the optical receiver 20D within the wavelength of 1330 nm to pass through, and the optical surfaces 322 might reflect the light traveling toward the optical receiver 20D (1330 nm). The light passing surface 321 and the optical surface 322 of the oblique prism 320 might allow for the light traveling toward the optical receiver 20B (1270 nm) to pass through.

Referring to FIG. 9, the optical receiver 20B may be disposed to correspond the right-angle prism 310, and the optical receiver 20D may be disposed to correspond the oblique prism 320. The external optical signals pass through the coupling lens 5 and the optical isolator 4 through the optical fiber 7. The coupling lens 5 might result in parallel light rays entering into the optical module 1c. When the external optical signals are within the wavelength of 1270 nm, such optical signals might be allowed to travel through the light passing surface 311 and the optical surface 312 before being received by the optical receiver 20B. When the external optical signals are within the wavelength of 1330 nm, such external optical signals might sequentially travel through the light passing surface 321, the optical surface 322, another optical surface 322 and another light passing surface 321 of the oblique prism 320. The optical path RX' is turned once at each of the two optical surfaces 322. The external optical signal within the wavelength of 1330 nm are eventually received by the optical receiver 20D non-coaxially aligned with the optical fiber 7.

By the path changer component 30 to change the optical path RX', the optical receiver 20D can receive external optical signals. Therefore, the optical design with the path changer component 30 might allow for the optical module 1c to be fabricated by using conventional hermetic package design as well as dual-receiving bidirectional type. For example, the optical module 1c can be fabricated using a TO-can package in which the optical receiver 20B and the optical receiver 20D are provided simultaneously.

As to some communication systems such as data centers and fiber-to-home (FTTH) equipment, to improve signal transmission efficiency and transmission distance always come with the increased production cost in connection with conventional optical modules and much larger overall volume. More specifically, due to harsh outdoor environment for long distance transmission, the optical modules tend to be designed in airtight package. However, the hermetic package suffers many restrictions on the configuration inside the optical modules. For example, multiple optical fibers cannot be coupled with single optical module due to size limitations. Therefore, the conventional optical modules with hermetic package are mostly unidirectional optical modules (that is, a single optical fiber could only transmit or receive the optical signals) to meet commercial demand for compact optical modules and low production cost. However, as the optical modules have gradually evolved toward being smaller in size and higher in data rate, it is difficult to further improve functions of unidirectional optical modules amid increasing demand for bidirectional optical modules with hermetic package.

According to the present disclosure, the path changer component is helpful to design a bidirectional optical module with hermetic package. For example, the configuration of the optical module in the present disclosure can include a TO-can package which generally accommodates either single optical transmitter or single optical receiver in addition to multiple active optical components. The active optical components may include a combination of one optical transmitter with one optical receiver, a combination of two optical transmitters, or a combination of two optical receivers.

Moreover, some optical components, such as wavelength division multiplexer (WDM) or duplexer, may be used for optical path design and multiplexing in a conventional bidirectional optical module, while these optical components may occupy space around the optical module. In contrast, the path changer component and the active optical components (optical transmitters and/or optical receivers) are integrated into a package housing of the optical module disclosed herein, which helps to not only meet the requirement of compactness but also enjoy lower production cost than a configuration including package housing and at least one of WDM and duplexer.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An optical module, comprising:
a housing having an airtight chamber;
a plurality of active optical components provided in the airtight chamber;
a path changer component provided in the airtight chamber, the path changer component being configured to change an optical path of at least one of the active optical components; and
wherein the path changer component comprises an oblique prism, the oblique prism has two first light passing surfaces substantially orthogonal to the optical path of the at least one of the active optical components and two first optical surfaces inclined with respect to the optical path, the two first light passing surfaces of the oblique prism allow for light within a first wavelength to pass through, and the two first optical surfaces of the oblique prism reflect light within the first wavelength, wherein the path changer component further comprises a right-angle prism, the right-angle prism has a second light passing surface substantially orthogonal to the optical path of the at least one of the active optical components and a second optical surface inclined with respect to the optical path, the second light passing surface of the right-angle prism allows light within a second wavelength different from the first wavelength to pass through, and the second optical surface of the right-angle prism is attached to one of the first optical surfaces of the oblique prism and allows for light within the second wavelength to pass through.

2. The optical module according to claim 1, wherein the housing comprises a cap for TO-can package.

3. The optical module according to claim 2, further comprising a carrier and a ceramic feedthrough, wherein the carrier is provided in the airtight chamber and carries the active optical components and the path changer component, and the ceramic feedthrough is partially provided within the housing.

4. The optical module according to claim 3, wherein the ceramic feedthrough is fixed to the housing by solder sealing.

5. The optical module according to claim 1, wherein at least one of the active optical components is coaxially aligned within a window of the housing.

6. The optical module according to claim 1, wherein each of the active optical components is configured to emit light with a wavelength of 1270 nm or more, or respond to light received within a wavelength of 1270 nm or more.

7. The optical module according to claim 1, wherein the active optical components comprise at least one of a combination of single optical transmitter with single optical receiver, a combination of two optical transmitters, or a combination of two optical receivers.

8. The optical module according to claim 1, wherein the active optical components comprises an optical receiver to correspond the oblique prism and an optical transmitter to correspond the right-angle prism, the optical receiver responds to light received within the first wavelength, the optical transmitter is configured to emit light within the second wavelength, and the oblique prism is configured to change an optical path of light received by the optical receiver.

9. The optical module according to claim 1, wherein the active optical components comprises two optical transmitters provided to correspond the oblique prism and the right-angle prism, respectively, the two optical transmitters are configured to emit light within the first wavelength and the second wavelength, respectively, and the oblique prism is configured to change an optical path of light emitted within the first wavelength.

10. The optical module according to claim 1, wherein the active optical components comprises two optical receivers provided to correspond the oblique prism and the right-angle prism, respectively, the two optical receivers are configured to respond to light received within the first wavelength and the second wavelength, respectively, and the oblique prism is configured to change an optical path of light received within the first wavelength.

* * * * *